United States Patent [19]

Montoye et al.

[11] Patent Number: 4,969,118

[45] Date of Patent: Nov. 6, 1990

[54] FLOATING POINT UNIT FOR CALCULATING A=XY+Z HAVING SIMULTANEOUS MULTIPLY AND ADD

[75] Inventors: Robert K. Montoye, Austin, Tex.; John Cocke, Bedford, N.Y.

[73] Assignee: International Business Machines Corporation, Armonk, N.Y.

[21] Appl. No.: 297,016

[22] Filed: Jan. 13, 1989

[51] Int. Cl.$^5$ ............................................. G06F 7/38
[52] U.S. Cl. ................................................... 364/748
[58] Field of Search .................... 364/748, 750.5, 754, 364/757–760, 768, 784

[56] References Cited

U.S. PATENT DOCUMENTS

| | | | |
|---|---|---|---|
| 4,075,704 | 2/1978 | O'Leary | 364/748 |
| 4,589,067 | 5/1986 | Porter et al. | 364/748 |
| 4,594,678 | 6/1986 | Uhlenhoff | 364/758 |
| 4,620,292 | 10/1986 | Hagiwara et al. | 364/748 |
| 4,736,335 | 4/1988 | Barkan | 364/748 |
| 4,831,577 | 5/1989 | Wei et al. | 364/757 |
| 4,852,037 | 7/1990 | Aoki | 364/758 |
| 4,866,652 | 9/1989 | Chu et al. | 364/748 |
| 4,888,682 | 12/1989 | Ngai et al. | 364/748 |

OTHER PUBLICATIONS

"A Suggestion For Fast Multiplier", by C. S. Wallace, IEEE Transactions on Computers, ED-13, Feb. 1964 pp. 14–17.

"Computer Systems Architecture", J. L. Baer (Rockville, MD) Computer Science Press 1980) pp. 108–110.

Primary Examiner—Dale M. Shaw
Attorney, Agent, or Firm—Terry J. Ilardi; Bernard E. Shay

[57] ABSTRACT

A single floating point that produces the result $A \times B + C$ with A, B and C being floating point numbers. The operand C is shifted in parallel with the beginning phases of the multiplication. The result is produced after a single addition and normalization, reducing hardware, delay and rounding errors.

3 Claims, 7 Drawing Sheets $A+B+C = CAR \times 2^1 + SUM \times 2^0$ $A+B+C+D+E+F+G = CAR_2 \times 2^2 + CAR_1 \times 2^1 + CAR_0$

FLOATING POINT UNIT FOR CALCULATING A=XY+Z HAVING SIMULTANEOUS MULTIPLY AND ADD

BACKGROUND OF THE INVENTION

I. Field of the Invention

The present invention relates generally to data processing and more specifically to an improved apparatus for performing ternary operations of the type $A \times B + C$ in a floating point unit.

II. Description of the Prior Art

The processing of floating point computations is important to modern computer operation. Experience shows that general purpose processors are not well suited to the performance of floating point computations, and as a result, specialized floating point units (FPU) or processors have been developed to handle numerically intensive computations.

The potential users of floating point hardware span the range from desktop microcomputers, through signal processing and parallel processing systems to the largest mainframes.

A floating point unit may be required to perform various mathematical operations on floating point numbers such addition, subtraction, multiplication and division. Some floating point hardware also provides built in features to support other mathematical operations such as computation of transcendental functions.

Since it is always useful to maximize the speed with which a floating point processor performs its functions, one known technique used to obtain performance gains is to provide specialized hardware to implement specific floating point functions. For example, certain combinations of arithmetic functions occur regularly in computations. The present invention is directed to an apparatus for use in a floating point processor optimized for the computation of expressions of the form $A \times B + C$. Various important mathematical concepts involve computations of this type, such as, for example dot products of the form $$\sum_{i=0}^{3} A_i \times B_i = A_0 \times B_0 + A_1 \times B_1 + A_2 \times B_2 + A_3 \times B_3$$

and Horner's Rule evaluations where:

$$Ax^3 + Bx^2 + Cx + D = D + x(C + x(B + Ax)).$$

Many floating point hardware units are implemented using VLSI (Very Large Scale Integration) for which the designer of VLSI FPUs often must consider the amount of space taken by specific functions and also optimization of FPU performance by maximizing its speed. Traditional FPU design has used separate multiply and add hardware units and a method for connecting the two units when the frequent multiply-add $(A \times B + C)$ operation was required. Fast multiplication requires a fast adder in its final stage, as shown in "A suggestion for a fast multiplier", by C. S. Wallace, IEEE Transactions on Computers, EC-13, Feb, 1964 pp14–17.

For High performance design, hardware to perform $(A \times B + C)$ requires:

- 2 fast adders (1 for the multiplication operation and 1 for addition)
- 2 round devices (1 for the multiplication operation and 1 for addition)
- 4 input ports (2 for the multiplication operation and 2 for addition)
- 2 output ports (1 for the multiplication operation and 1 for addition)
- 2 instruction (1 for the multiplication operation and 1 for addition This invention will reduce required elements by a merge of the multiplication operator and the addition operator.

SUMMARY OF THE INVENTION

In accordance with a preferred but nonetheless illustrative embodiment demonstrating objects and features of the present invention there is provided a novel apparatus and method for performing floating point operations of the type $A \times B + C$. The multiplication of A and B is performed, and simultaneously therewith the addend C is aligned in preparation for the addition operation.

It is thus an object of the invention to provide a single hardware structure capable of producing the operation of $A \times B + C$, where A, B and C are floating point numbers.

It is another object to provide minimum delay from any input to the result of the $A \times B + C$ operation.

It is a further object to provide increased accuracy for the $A \times B + C$ operation, by producing a single round operation.

It is still a further object to provide reduced hardware demands by requiring only a single unit to produce the operation $A \times B + C$.

It is still a further object to provide a unit with reduced input/output ports by producing a single unit with 3 input and 1 output ports for the operation $A \times B + C$.

It is still a further object to provide a unit with reduced instruction requirements by producing a unit with a single instruction with 3 input and 1 output operands to represent the operation $A \times B + C$.

These and other objects, advantages, and features of the invention will be further explained with respect to the following description and the annexed drawings.

DESCRIPTION OF THE PREFERRED EMBODIMENTS

Figure 1:
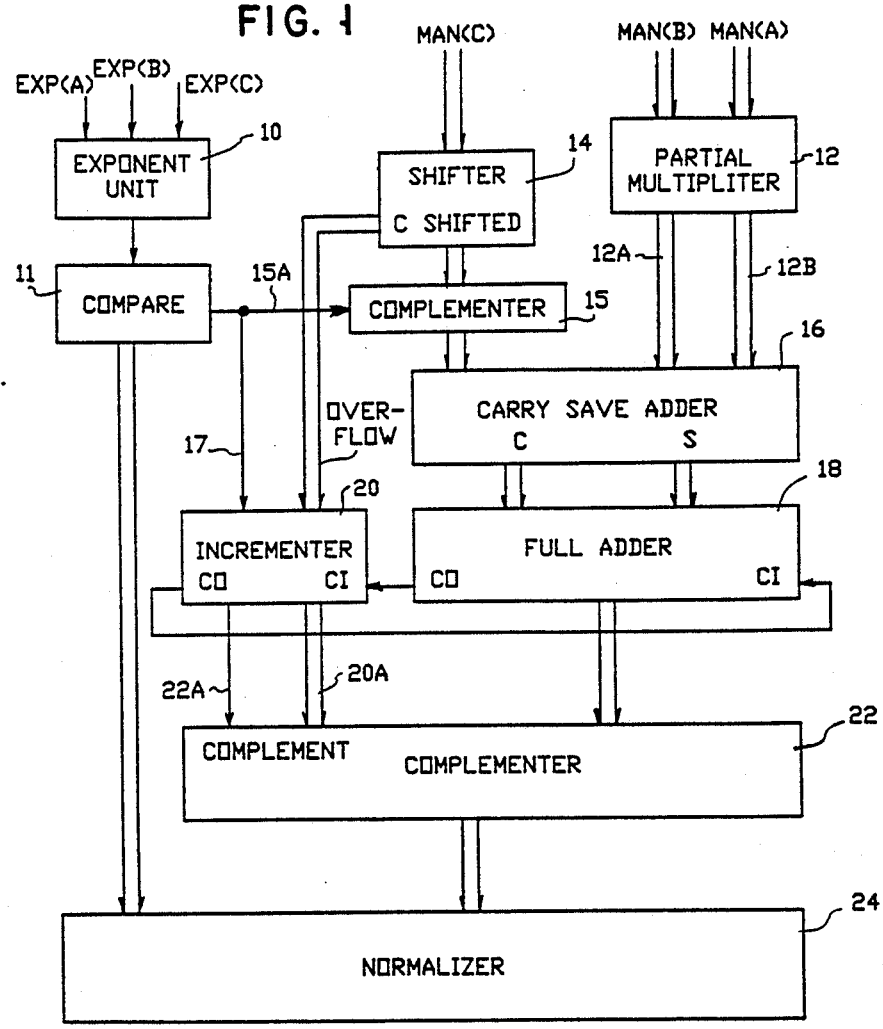
FIG. 1 is block diagram of the present invention.

The present invention provides an apparatus that performs fast and accurate floating point arithmetic operations of the type $A \times B + C$.

Floating point numbers have a form in which there is a signed mantissa that is multiplied times a radix raised to an integral exponent. Thus in decimal notation the number 101.32 would be written as $0.10132 \times 10^3$ where 3 is the exponent and 0.10132 is the mantissa. In this example, the radix or base of the number is 10. Floating point notation can also be used with numbers to other bases, and in the case of high speed digital computers, floating point numbers are in binary. Thus a binary number of the form 101.011 could be written as a floating point number of the form $0.101011 \times 2^3$ where the mantissa is 0.101011, the exponent is 3, the radix, or base is 2, and the point is referred to as a binary point instead of a decimal point. Of course, in a digital computer, the exponent 3, would become the binary number 11.

It will be recognized that when performing additions of binary floating point numbers, the numbers must be lined up with respect to the binary point, in order to perform the addition correctly. When the additions are performed the numbers to be added should have the same exponent. Then there can be a straightforward addition of the mantissas.

In multiplication, the mantissas may be multiplied using any of several known techniques and the exponents are added. It will be clear that if A and B are multiplied having M and N bit wide mantissas respectively, the maximum length of the result is M+N. The exponent will be of a size resulting from the addition of the two exponents. It will be clear then that the number C to be added to the result $A \times B$ will not likely have the same exponent as the result, and therefore will have to be shifted so that it aligns properly with the result of $A \times B$.

The present invention performs operations of the type $A \times B + C$. It will be recognized that such a unit can be used as the basis for an Arithmetic Logic Unit (ALU) since simple multiplications $A \times B$ can be performed by setting C=0 and simple additions can be performed e.g. A+C, by setting B (or A)=1.

Consider the operation of $A \times B + C$, where A, B and C are floating point numbers with m bit mantissas and e bit exponents. In the present invention, the C operand is aligned to the floating point product of A and B by shifting the C operand a number of bits equal to exponent of A + exponent of B − exponent of C. In the present invention this activity can take place in parallel with the bit production and compression required in multiplication. A partial multiplier is used to obtain two addends the sum of which is equal to the result $A \times B$. These addends, or partial products, are determined in parallel with the shifting of the C operand.

It is well known that a multiplication takes a time of at least log(m) where m is the number of bits in the input word, to reduce the partial products to 2 numbers that must be added to obtain the final product. By alignment of the C term to the product of the $A \times B$ operation during the multiplication time, the addition operation causes little additional delay over the multiplication operation. After the alignment and inclusion of the C term in the reduction, a final addition of the 2 terms must take place. If the C exponent is smaller than the sum of the A and B exponents by more than 2 m bits, the C result is less significant than any bits in the multiplication of A and B. Therefore, the bits of C are "shifted out" of the range of $A \times B$ and not used in the product. If, in a $A \times B + C$ operation, the C exponent is larger than the sum of the A and B exponents by a small (less than m) value, it is possible that an overflow may result from the addition required for completion of the multiplication. This overflow must be added to the overflow range of the C shifter in an incrementer that functions as an adder that increments its input if there is a carry-in.

If the C exponent is larger than the sum of the A and B exponents by greater than m, the result of the multiply-add operation is C. If the C exponent is less than the sum of the A and B exponents by more than 2 m, the result of the multiply-add operation if C. Any exponent difference outside of the 3 m interval has the result of C (if the C exponent is larger) or $A \times B$. Therefore the final result must be produced using an adder of 2m bits (required for multiplication) and an incrementer of m bits (required for the overflow range). Then the 3 m result must be normalized and rounded to eliminate leading zeroes and to provide the greatest accuracy.

Figure 2:
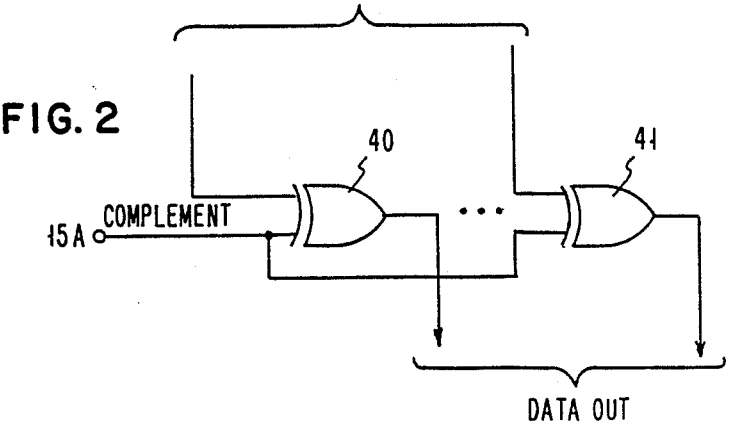
FIG. 2 shows a complementer used in the present invention.

Refer now to FIG. 1 which shows a block diagram of a preferred embodiment of the invention. Exponent Unit 10 receives the three exponents EXP(A), EXP(B) and EXP(C). The primary function of exponent unit 10 is to determine the value of EXP(A)+EXP(B)−EXP(C), which is performed by an adder. Exponent Unit 10 has additional functions, associated with for example the handling of signed numbers. The present invention is intended to use signed numbers having a sign bit, where a 0 sign bit indicates a positive number and a 1 sign bit indicates a negative number. The sign bit may be in different places as long as its use within the number is consistent. In most conventional systems the sign bit occupies the position of the most significant bit. Signed numbers may be easily handled by digital circuitry when converted into their ones complement form. In the present invention the signs of A, B, and C are compared in exponent unit 10. If the sign of C differs from the result of $A \times B$ as determined by compare 11, then the output of shifter 14 (including the overflow) is complemented in a one's complement form by complementer 15. Complementer 15 can be constructed as shown in FIG. 2 and includes exclusive OR gates 40 through 41. It will be apparent to those of skill in the art that the number of exclusive OR gates will depend upon the number of bits in the binary number being used in the system. Whenever a complement signal is received at terminal 15A the DATA IN is complemented and provided as DATA OUT.

The mantissas of A and B, respectively denoted MAN(A) and MAN(B) are received by partial multiplier 12. Partial multiplier 12, whose operation will be further described below, multiplies A and B, but provides only a partial product, comprised of two addends whose sum is $A \times B$.

The mantissa of operand C, denoted MAN(C), is applied to shifter 14, that operates in the manner of an ordinary shifter to shift C to the right by the amount determined from the calculation EXP(A)+EXP(B)−EXP(C). This value is applied to input 14A of shifter 14, and in turn, controls the amount that shifter 14 shifts its input MAN(C) to the left. The shifted output of MAN(C), denoted herein as $C_{shifted}$, is applied, together with the partial products from partial multiplier 12, to carry/save adder 16. Any overflow from the shift operation (EXP(A)+EXP(B)−EXP(C)) that is negative causes a left shift. It will be noted that overflow occurs whenever C is more significant than A and B, i.e EXP(C)>EXP(A)+EXP(B).

Carry/save adder 16 is a normal carry save adder known in the art, having three inputs and two outputs, the two outputs being the sum and carry outputs denoted respectively as S and C.

The C and S outputs of carry save adder 16 are applied to full adder 18, which is an ordinary adder known in the art that adds the two C and S results from Carry/- save adder 16. It also, includes a carry-in (CI) input for receiving a carry-in, and a carry-out output (CO) for providing a carry-out if in fact the result of the add operation generates a carry-out.

The signal from compare 11 is also applied on lead 17 to incrementer 20 as the one's complement sign and placed in the first bit position. This signal is then eventually transferred to complementer 22 at terminal 22A, depending on the outcome of the incrementation by incrementer 20, to turn the complementation in complementer 22 on or off as required.

The CI is received from incrementer 20, which receives the overflow from shifter 14. Incrementer 20 functions as an adder with one input set to zero. It thus functions to increment the overflow from shifter 14 if there is a CO from full adder 18, which CO is applied at incrementer 20 carry in (CI) input. If the result of the incrementing in incrementer 20 causes a carry out (CO) this CO is applied to the aforementioned CI input of full adder 18. The incremented output is applied at 20A.

Complementer 22 receives the output of full adder 18 and incrementer 20 and complements the values received. This is necessary in order to handle signed numbers as described above.

Normalizer 24 functions to eliminate leading zeroes and thus maximize the accuracy of the result. Normalizer 24 may be realized by any circuit that recognizes leading zeroes and functions to shift the mantissa and increment or decrement the exponent accordingly. One particularly fast circuit that performs this operation is described in applicant's copending application "Leading 0/1 Anticipator(LZA)", S.N. 255,089, filed Oct. 7, 1988, now U.S. Pat. No. 4,926,369 and assigned to the assignee of the present invention. This circuit permits the determination of the leading zeroes prior to completion of the determination of the result and thus incurs no additional delay.

Rounding is required to conform the significance of the multiply-add operation to the required precision, often the original precision of the inputs. Prior art required 2 such rounding operations, one following the multiplication operation, and one following the addition operation. Precision may be lost in these two rounding operations. For example, using $m=8$:

$$a = 0.11111110 \times 2^0$$

$$b = 0.10000001 \times 2^1$$

$$c = -0.1 \times 2^0.$$

$$a \times b = 0.1111111111111110 \times 2^0$$

(rounded to 8 places) $= 0.1 \times 2^1$ $$a \times b + c = 0.1 \times 2^1 - 0.1 \times 2^1$$

$$= 0$$

as a single operation, $$a \times b + c = -0.00000000000001 \times 2^0$$

$$= -0.1 \times 2^{-13}.$$

since the full precision of the multiplication is retained through the addition.

Notice that the number of input and output ports of the combined multiplier and adder is 3 inputs and one output or 4 ports. This is significantly less than the prior art that has 2 inputs and 1 output for each of the multiplier and adder, or 6 total ports. Thus a single instruction with 4 address fields can address the combined multiply-add unit, significantly reducing instruction length for floating point operations.

A pipeline register can be conveniently inserted before the full adder 18 and the incrementer 20. Since the delay for multiplication and reduction to 2 operands is similar to the delay for addition, the pipeline stages are conveniently balanced. Additionally the number of bits which must be latched are approximately 4 m (multiplication) + m (overflow) thus making the pipeline stage efficient.

Figure 6:
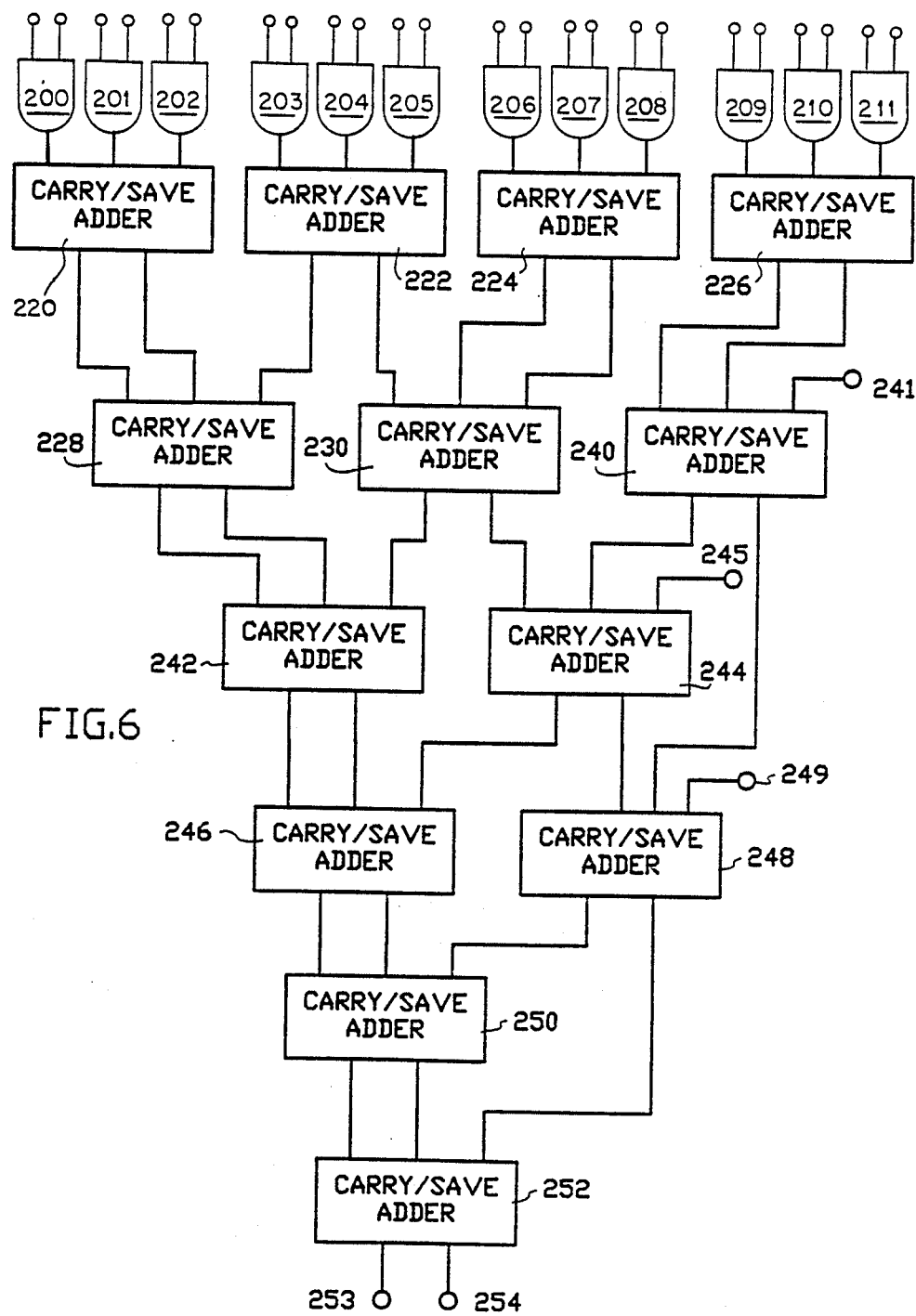
FIG. 6 shows a Wallace Tree used as a partial multiplier in the present invention.

Some multiplication trees, which may be used as partial multiplier 12, have additional inputs that allow $C_{shifted}$ to be inserted in the multiplication at no delay penalty (FIG. 6). The worst case penalty, however, is that from a carry save adder, which is a small percentage of the cycle time. This permits the multiplication operation to be merged with the addition operation with only a minor impact upon the speed of multiplication.

Partial multiplier 14, as stated above, provides two partial products, that when added together equal the desired result. There are numerous ways to construct such a multiplier, but in the preferred embodiment of the present invention, a structure know as a Wallace Tree is used to provide considerably faster operation.

Figure 3:
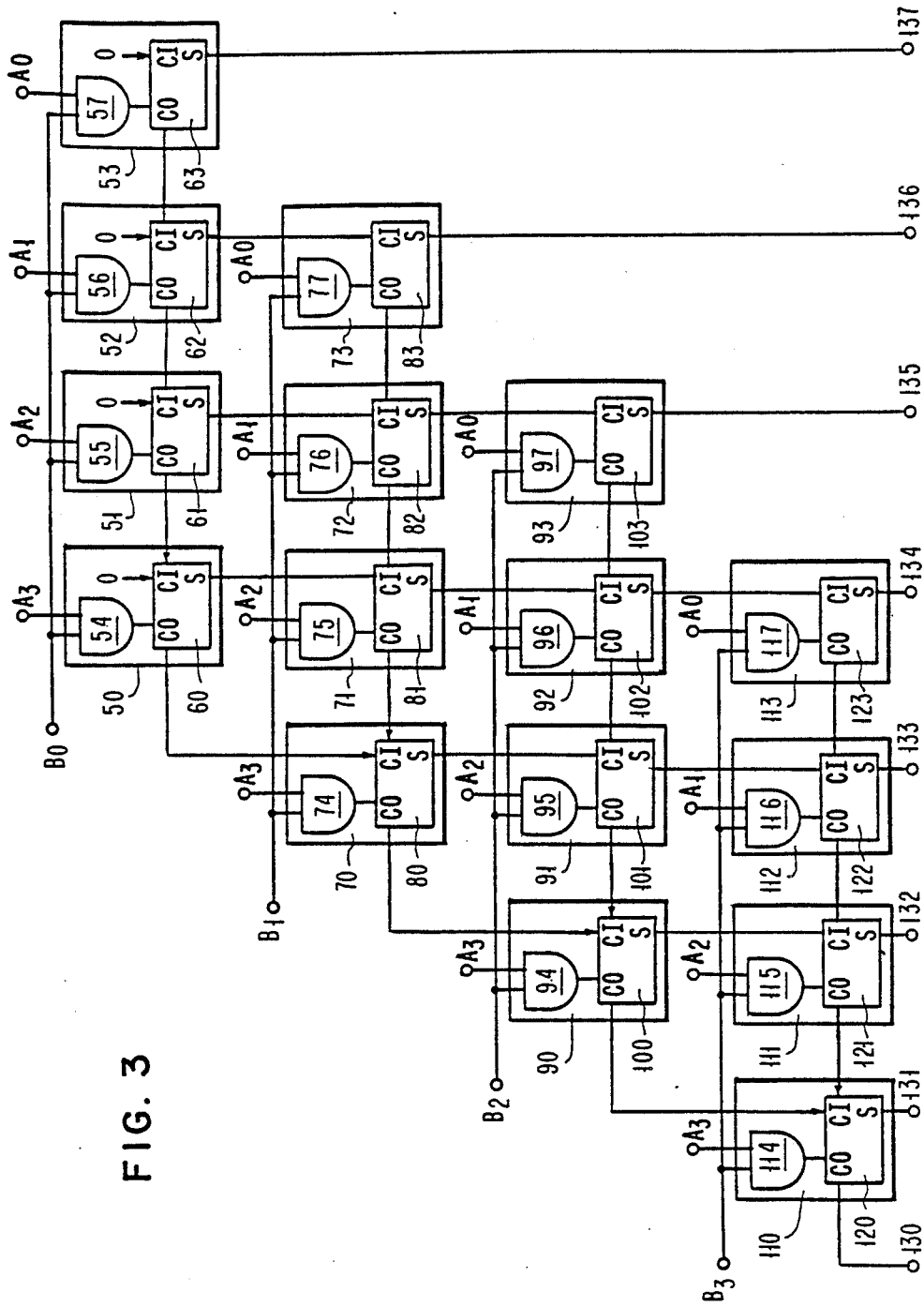
FIGS. 3, 4 and 5 show an array multipliers useful in explaining the present invention.

In order to understand the operation of a Wallace Tree it is useful to first understand the operation of an array multiplier as shown in FIG. 3. For convenience in explanation a four bit array multiplier, adapted to multiply two four bit numbers is shown. In most implementations of the present invention a much larger number of bits will be operated on. For purposes of explanation the multiplier of FIG. 3 is shown for multiplying the numbers $A_1A_2A_3A_4$ and $B_1B_2B_3B_4$ each $A_i$ and $B_i$ represent bits of the four bit numbers A and B, respectively.

The multiplier of FIG. 3 comprises a plurality of cells, 50-53, 70-73, 90-91 and 110-113. Each of these in turn comprises AND gates 54-57, 74-77, 94-97 and 110-117 respectively. The inputs of each AND gate are each coupled to the specific $A_i$ and $B_i$ to be multiplied and the AND gates provide essentially a single bit multiplication. This will be intuitively obvious when it is considered that only 1's and 0's are being multiplied, and the result of such a multiplication can in turn only be 1 or 0. The AND gate provides this function.

While each bit may be individually multiplied, it is also necessary to add the results of the individual multiplications. Each cell also contains a full adder, denoted 60-63, 80-83, 100-103 and 120-123. These full adders have three inputs, two for receiving a bit to be added, a carry-in from a previous adder in a multi-bit adder, and a carry-out that goes to the carry-in of a subsequent adder. One of the inputs of the full adders 60-63 are each set to 0 since this is the first group in the array. Also, the carry-out of the most significant cell of each row in the array is carried to the input of the cell below. This type of structure accomplishes the same type of addition that a person might perform manually where each digit of a number is multiplied by one digit of the multiplier. The results of subsequent numbers in the multiplier are each shifted by one decimal place to the right, and the shifted results are then added. The outputs 130-137 will then have the final result.

Such multipliers are slow because the paths that a number follows is long. For example, a carry out from cell 53 must go through eight cells (53, 52, 73, 72, 93, 92, and 113, 112) before it reaches the final result. Multipliers built, however, on a similar scheme can be built that are much faster.

Figure 4:
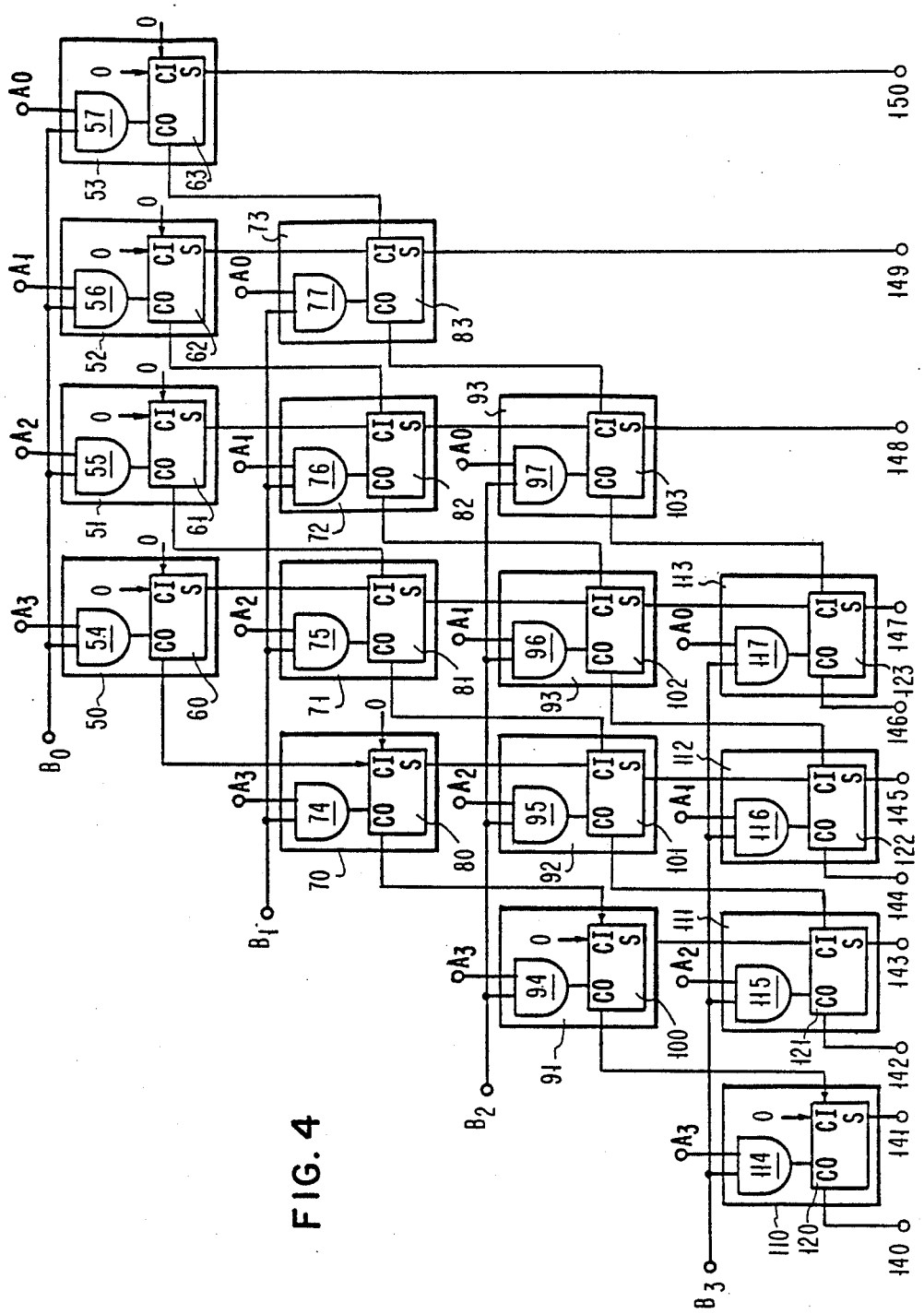

One incrementally faster multiplier is shown in FIG. 4. This multiplier is very similar to that shown in FIG. 3 except that the carry outs are applied to the carry in of the cell immediately below and diagonally to the left. It will be understood by those of skill in the art that such a structure is permissible since the carry outs are still added in columns having the same weight or significance that they would have had in the multiplier of FIG. 3. The carry in of the adders 60–63 are set to 0 since they no longer receive a carry-in from their neighboring adders. It will be clear that this multiplier is faster because a carry must not traverse as long a path. For example, the carry out from 63 now must only travel through four adders, namely, 63, 83, 103 and 123. Two disadvantages this structure may be considered to have is that it now generates two partial products instead of a final result and that it uses more wires. The partial products can be resolved into the final result, by, however a carry save adder such as 16.

Figure 5:
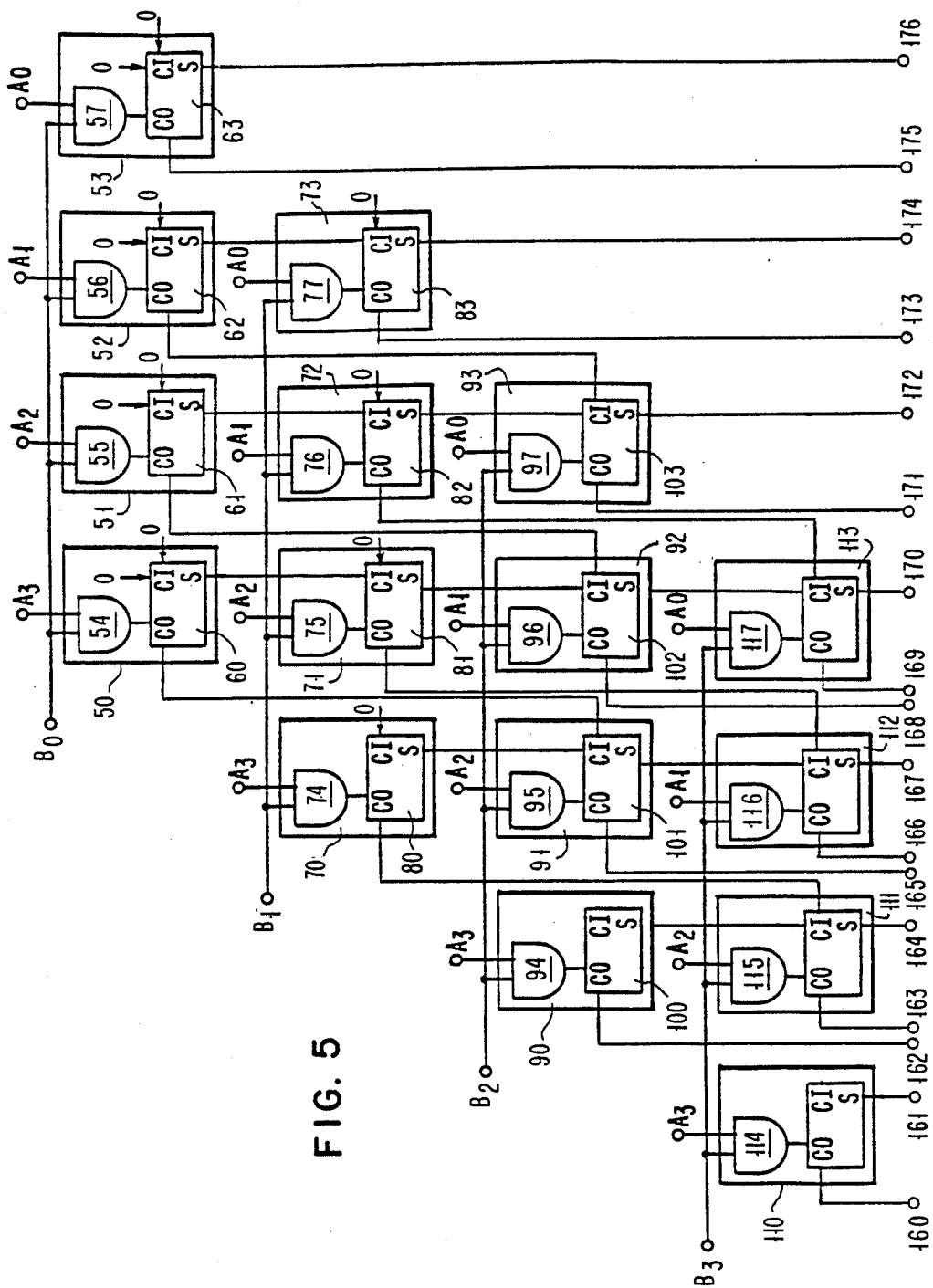

Each lead of the output contains a partial product, but, for example, certain lead pairs, namely 141 and 142, 143 and 144 and 145 and 146 have the same weight and are added by a full adder. The other leads, namely 140, 148, 149 and 150 also contain partial products but the partial products for these bit positions have already been resolved by the structure. They can be used as is, or alternatively, if fed to a full adder one of the inputs of the full adder would need to be set to zero. Although this structure is considerably faster than that shown in FIG. 3 further improvements are possible. FIG. 5 shows an even faster multiplier. In the multiplier of FIG. 5 the carry out of the full adders jumps not simply to the adder diagonally below it but two rows below it, (again to the column that is immediately adjacent to its left). This structure is faster since the intermediate results have even less distance to traverse. The outputs 161, 162, 163 and 164, 165, 166 and 167, 168 and 169 each have the same weight and will be added by a carry save adder to provide two outputs. Leads 170, 171 and 172, 173 and 174, 176 also have the same weights. Leads 160 and 176 are already resolved to a single bit and thus there is no additional adder required.

FIG. 6 shows a Wallace tree arrangement and is described in Baer, J. L. Computer Systems Architecture, (Rockville, Md.: Computer Science Press, 1980) pp. 108-110). The Wallace tree is essentially an extension of the arrangement of FIG. 5. Referring again to FIG. 5 it will be understood that the adders such as 63 are no longer necessary since they only have 0 added to two of their inputs. In the situation where many rows are skipped the Wallace Tree as shown in FIG. 6 is obtained. The AND gates 200–211 of FIG. 6, correspond to AND gates 50, 71, 92, 113 of FIG. 5. For purposes of explanation FIG. 6 describes a 12 bit multiplication scheme, while FIG. 5 is merely a 4 bit multiplier. Significantly, input 249 is required 3 carry-save adder delays later than the inputs to 220, 222, 224, and 226. This input could be $C_{shifted}$ from shifter 14 and complimenter 15, assuming a sufficiently fast shifter, and produce the multiply-add without any additional carry-save delay.

Figure 7A:
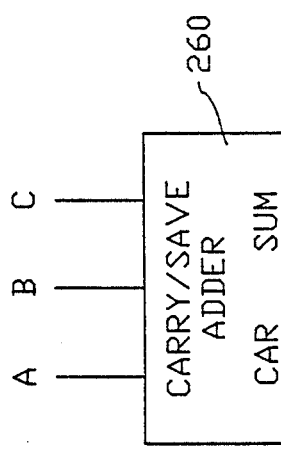
FIG. 7A shows a carry-save adder that is used in the partial multiplier of present invention described as a (3,2) adder.
Figure 7B:
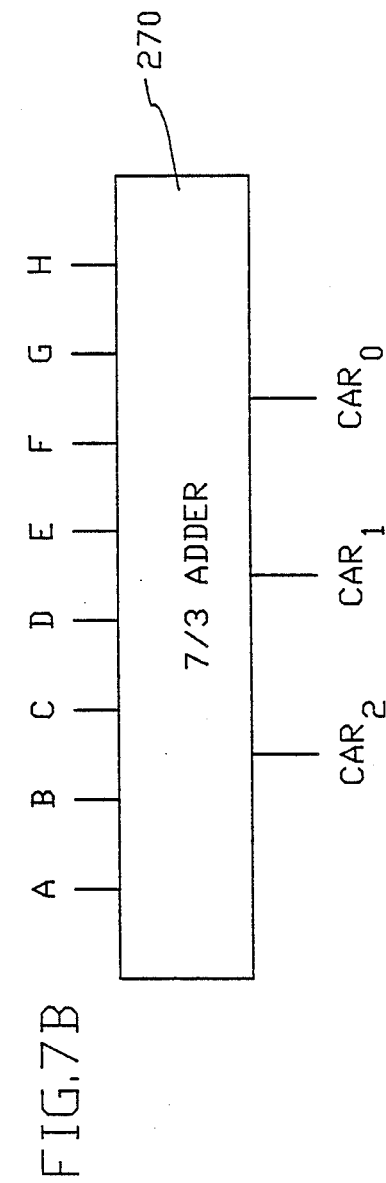
FIG. 7B shows a (7,3) adder.

To minimize the wiring complexity of multiplication, Wallace trees can be further extended by using structures more powerful than carry-save adders. A carry-save adder is a 3 to 2 adder (3,2), that has 3 inputs at weight $2^0$ and 2 outputs: one of weight $2^1$ and one of weight $2^0$. It has 5 input/output connections, and 1 less output than input. A 7 to 3 adder (7,3) has 7 inputs at weight $2^0$ and 3 outputs: one of weight $2^0$, one of weight $2^1$, and one of weight $2^2$. Since this adder has 4 fewer outputs than inputs, only $\frac{1}{4}$ as many (7,3) adders are required to perform the same function as carry-save adders. Since the total number of inputs and outputs is 10, or twice as many as in the case of a carry-save adder, the total number of connections to (7,3) adders is $\frac{1}{2}$ of that required for carry-save adders. FIG. 7A shows an I/O representation for a carry-save (3,2) adder 260 and FIG. 7B shows a comparable I/O representation for a (7,3) adder 270.

Figure 8:
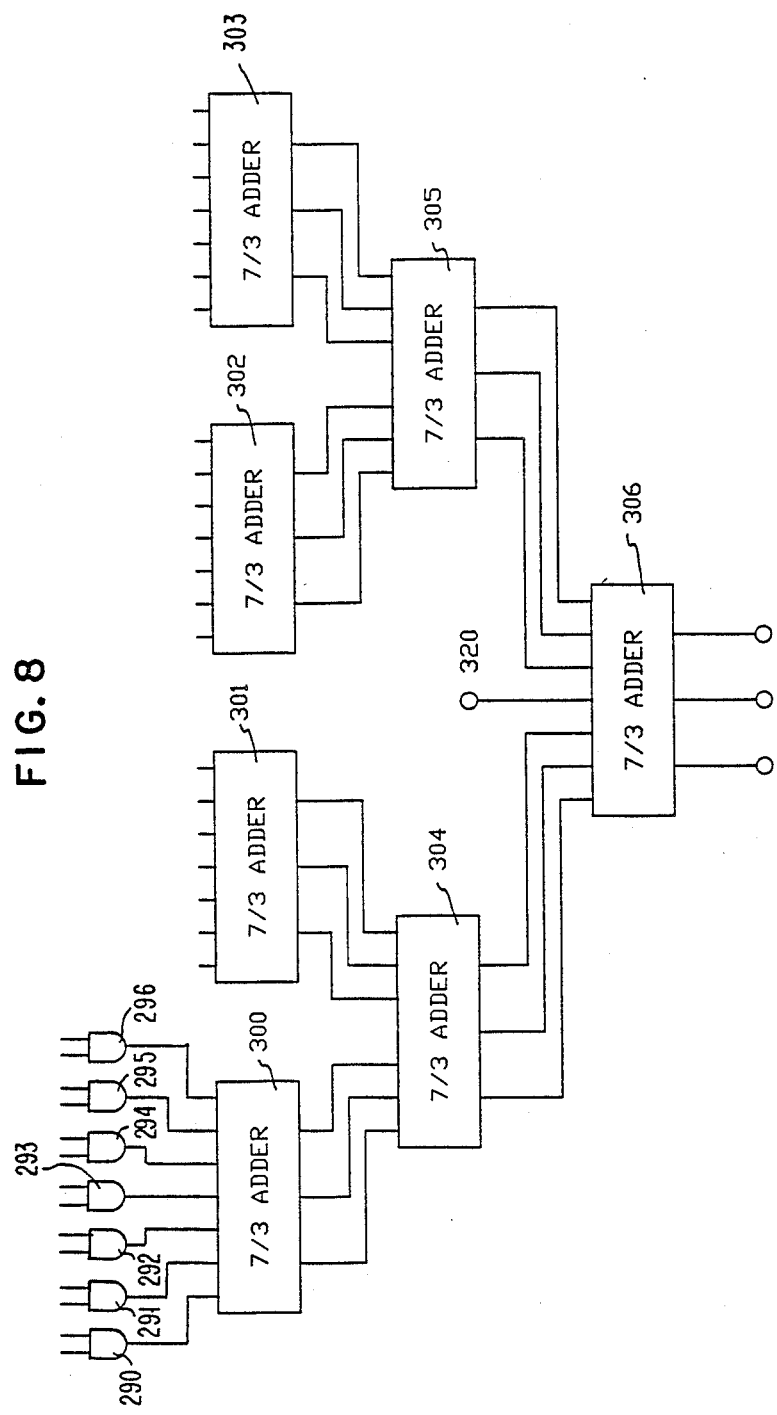
FIG. 8 shows (7,3) adders used in a partial multiplier in the present invention.

FIG. 8 shows a preferred implementation for a 28 bit multiplication tree with the $C_{shifted}$ being included on input 320, allowing 2 (7,3) adder delays for the shift and compliment operation. This multiplication tree, which is similar to the previously described Wallace tree extended to use 7/3 adders 300–306. Input 320 corresponds to input 249 of the Wallace tree in FIG. 6 and receives the $C_{shifted}$ from complementer. As in FIG. 6, AND gates 290–296 perform the multiplication. The arrangement of the AND gates would be repeated at the inputs of each of 7/3 adders 301, 302 and 303. Booth encoding, as mentioned in Computer Systems ARchitecture, (Rockville, Md.: Computer Science Press, 1980) pp. 108-110). can be used in the place of the and gates 290–296 to increase the number of inputs to 28×2.

While the invention has been described in its preferred embodiments, it is to be understood that changes in form and details of the above description may be made without departing from the true scope and spirit of the invention.

I claim:

1. An apparatus for performing the floating point operation (A×B+C) said apparatus comprising:
   means for multiplying A×B to generate a first partial results, alignment means for aligning C with said first partial results, said multiplication being performed in parallel with said alignment of C operation;
   said multiplying means and said alignment means being connected to means for adding said first partial result and said aligned C;
   means connected to said alignment means and said adding means for incrementing said C operand when said C operand has higher significance than a sum of said first partial results; and
   normalizing means connected to said incrementing means and said adding means.

2. The apparatus according to claim 1 wherein said multiplier means and said adder have approximately the same processing delays.

3. The apparatus according to claim 2 wherein said multiplier means and said adder means have input to output delay proportional to the logarithm of the mantissa input bits.

* * * * *